No. 767,915. PATENTED AUG. 16, 1904.
H. SCHLEUSNER.
THRESHING MACHINE.
APPLICATION FILED JUNE 3, 1903.
NO MODEL.
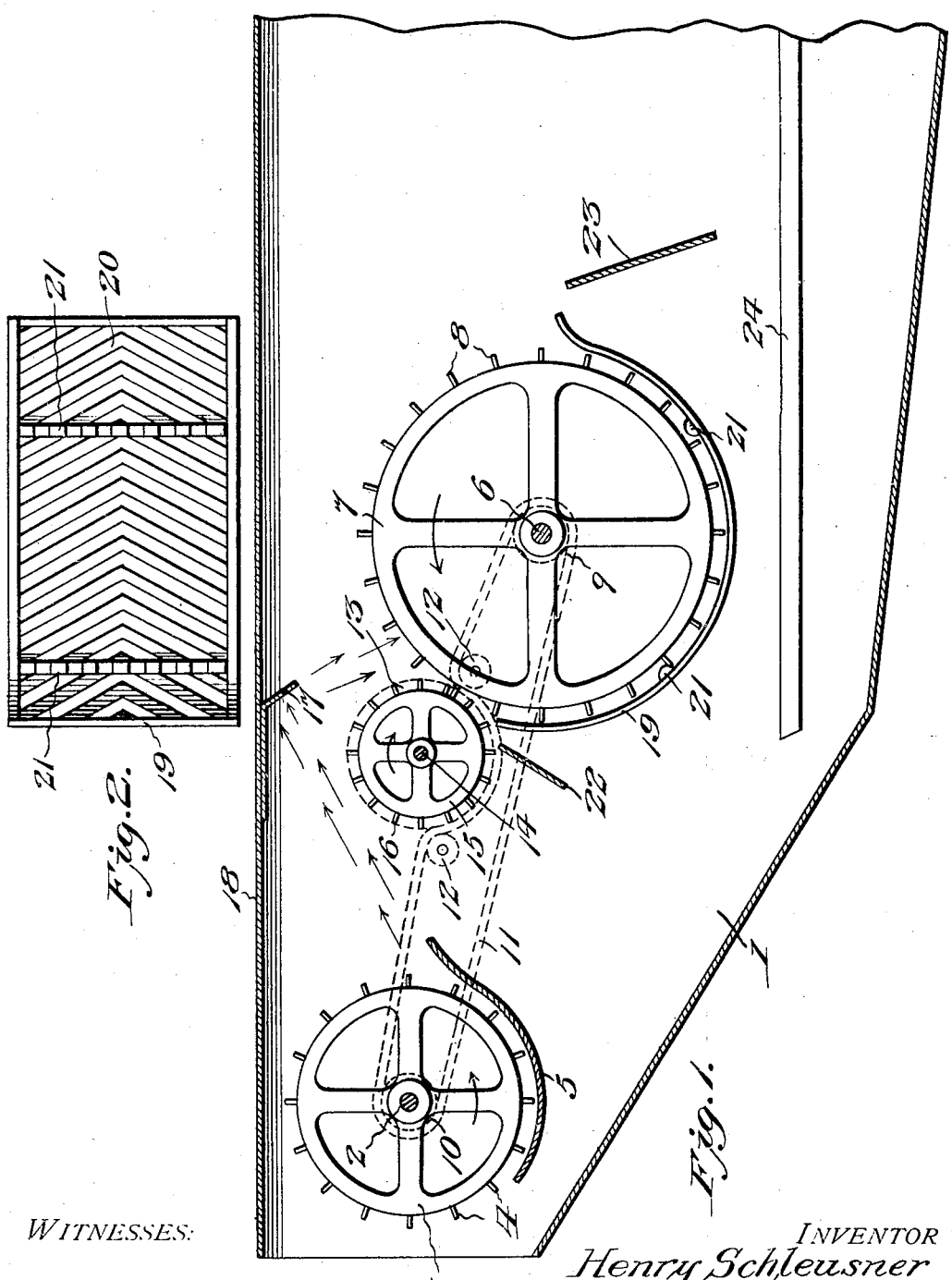
WITNESSES:
INVENTOR
Henry Schleusner
BY
Victor J. Evans
Attorney No. 767,915.

Patented August 16, 1904.

UNITED STATES PATENT OFFICE.

HENRY SCHLEUSNER, OF GARNER, IOWA.

THRESHING-MACHINE.

SPECIFICATION forming part of Letters Patent No. 767,915, dated August 16, 1904.

Application filed June 3, 1903. Serial No. 159,972. (No model.)

*To all whom it may concern:*

Be it known that I, HENRY SCHLEUSNER, a citizen of the United States, residing at Garner, in the county of Hancock and State of Iowa, have invented new and useful Improvements in Threshing-Machines, of which the following is a specification.

My invention relates to new and useful improvements in threshing-machines, and more particularly to grain-separators for use in connection therewith. Its object is to provide a rotary means for stripping the straw and for separating the grain therefrom, said means being simple, durable, and inexpensive in construction and adapted to be easily operated.

With the above and other objects in view the invention consists in providing a threshing-machine with a cylinder having teeth upon the periphery thereof, and this cylinder is adapted to engage the straw and throw it upward into contact with a deflector which serves to deflect the material downward upon a rapidly-rotating separating-cylinder. A retarding-cylinder rotates slowly adjacent the separating-cylinder, and the material is adapted to be combed and stripped between teeth upon the separating and retarding cylinders and is carried downward over a grate of peculiar construction, where the grain is separated from the straw and discharged by gravity into a grain-pan provided therefor.

The invention also consists in the novel construction, combination, and arrangement of parts hereinafter more fully described and claimed, and illustrated in the accompanying drawings, showing the preferred form of my invention, and in which—

Figure 1 is a vertical section through the separating mechanism employed in connection with a threshing-machine, and Fig. 2 is a plan view of the grate with the separating-cylinder removed.

Referring to the figures by numerals of reference, 1 is the body of a threshing-machine, within which is journaled a shaft 2, having a throwing-cylinder 3 thereon, which is provided with teeth 4 extending from its periphery. A curved bed or guide plate 5 is arranged under the cylinder 3, so as to prevent the material fed to the cylinder from falling out of the path of the teeth thereon. A second shaft 6 is journaled within the body 1 and has a separating-cylinder 7 thereon, from the periphery of which extend teeth 8. A sprocket 9 is arranged on the shaft 6, and a similar sprocket 10 is secured to the shaft 2. A chain 11 extends over these two sprockets and also over idlers 12, which are arranged at opposite sides of a large sprocket 13, secured to a shaft 14, on which is arranged a retarding-cylinder 15. This cylinder is located close to the upper portion of the separating-cylinder and has sharp prongs or teeth 16 extending from the periphery thereof and adapted to work between the teeth 8 on the cylinder 7. A deflector-plate 17 is secured to the deck 18 of the threshing-machine and so located as to direct downward upon the separating-cylinder 7 the material thrown thereagainst by the cylinder 3.

A curved grate 19 is concentric with and incloses the lower half of the separating-cylinder 7, and this grate is formed of parallel V-shaped bars 20, as shown in Fig. 2. Arranged on these bars are preferably two parallel rows of projections 21, which are arranged between paths of teeth 8 on cylinder 7 and are adapted to retard the passage of material over the grate. A deflecting-plate 22 is arranged below the retarding-cylinder 15 and adjacent the inner end of the grate 19, and a retarding-plate 23 is also arranged adjacent the opposite end of the grate 19, and these two plates serve to direct grain downward to a pan 24 provided therefor.

In operation the material is supplied to the cylinder 3 in any desired manner, and as this cylinder rotates very rapidly it will engage the material and will throw it upward against deflector-plate 17, by which it will be directed downward adjacent to the pass between the cylinders 7 and 15. As the cylinder 7 rotates very rapidly and the cylinder 15 rotates slowly, it is obvious that the material engaged by the teeth 8 and 16 of the two cylinders will be combed or stripped thereby and carried over the grate 19. The projections 21 serve to retard the movement of the material over the grate. The grain will fall down between the bars 20 of the grate and upon the pan 24, and should any of the grain be thrown outward from points adjacent the ends of the grate it would be deflected downward into the pan by plates 22 and 23. The straw after leaving the grate can be directed in any desired manner to a suitable receptacle provided therefor.

In the foregoing description I have shown the preferred form of my invention; but I do not limit myself thereto, as I am aware that modifications may be made therein, and I therefore reserve the right to make such changes and alterations as may fairly fall within the scope of my invention.

Having thus described my invention, what I claim as new, and desire to secure by Letters Patent, is—

1. In separating devices for threshing-machines, the combination of a throwing-cylinder, a separating-cylinder, a retarding-cylinder disposed between said cylinders, and nearest to said separating-cylinder, the latter having teeth thereon, a deflector located in the path of the material operated upon by the throwing-cylinder, and above the pass between the separating and retarding cylinders, means for rotating the several cylinders mentioned at different speeds, and a curved grate concentric with and located beneath said separating-cylinder, said grate having parallel projections thereon between which the teeth on the separating-cylinder work.

2. In separating devices for threshing-machines, the combination of a toothed throwing-cylinder, a toothed separating-cylinder, a toothed retarding-cylinder disposed between said cylinders, and nearest to said separating-cylinder, the teeth of said retarding-cylinder working between the teeth of said separating-cylinder, a deflector disposed in the path of the material operated upon by the throwing-cylinder, and above the pass between the separating and retarding cylinders, a curved grate beneath said separating-cylinder, another deflector beneath the retarding-cylinder and adjacent to the inner end of the grate, a retarding-plate adjacent to the outer end of said grate, and means for operating the several cylinders mentioned at different speeds.

In testimony whereof I affix my signature in presence of two witnesses.

HENRY SCHLEUSNER.

Witnesses:
LOUIS SCHLEUSNER,
JOS. BYERS.